(12) United States Patent
Yang et al.

(10) Patent No.: US 10,759,003 B2
(45) Date of Patent: Sep. 1, 2020

(54) METHOD AND SYSTEM FOR DYNAMICALLY FOLLOWING LASER CUTTING WITH MAGNETIC BELT

(71) Applicant: BAOSHAN IRON & STEEL CO., LTD., Shanghai (CN)

(72) Inventors: Saidan Yang, Shanghai (CN); Ruimin Wu, Shanghai (CN); Junliang Qiao, Shanghai (CN); Ye Ding, Shanghai (CN)

(73) Assignee: Baoshan Iron & Steel Co., Ltd., Shanghai (CN)

(*) Notice: Subject to any disclaimer, the term of this patent is extended or adjusted under 35 U.S.C. 154(b) by 416 days.

(21) Appl. No.: 15/754,528

(22) PCT Filed: Mar. 29, 2016

(86) PCT No.: PCT/CN2016/077622
§ 371 (c)(1),
(2) Date: Feb. 22, 2018

(87) PCT Pub. No.: WO2017/036126
PCT Pub. Date: Mar. 9, 2017

(65) Prior Publication Data
US 2018/0243862 A1  Aug. 30, 2018

(30) Foreign Application Priority Data

Aug. 31, 2015  (CN) .......................... 2015 1 0546849

(51) Int. Cl.
*B23K 26/38* (2014.01)
*B23K 26/08* (2014.01)
(Continued)

(52) U.S. Cl.
CPC ............ *B23K 26/38* (2013.01); *B23K 26/032* (2013.01); *B23K 26/0838* (2013.01);
(Continued)

(58) Field of Classification Search
CPC .. B23K 26/38; B23K 26/032; B23K 26/0838; B23K 26/0876; B23K 26/16; B23K 37/00; B23K 37/0235; B23K 4/08
(Continued)

(56) References Cited

U.S. PATENT DOCUMENTS 5,185,510 A  2/1993  Zumstein
2013/0334739 A1*  12/2013  Miller ................... B23K 26/16
                                                                 264/400

(Continued)

FOREIGN PATENT DOCUMENTS

CN  101434009 A  5/2009
CN  102218601 A  10/2011
(Continued)

OTHER PUBLICATIONS

PCT/CN2016/077622 International Search Report and Written Opinion, dated Jun. 8, 2016.

*Primary Examiner* — Huyen D Le
(74) *Attorney, Agent, or Firm* — Thomas Horstemeyer, LLP

(57) ABSTRACT

Provided are a method and a system for enabling magnetic belts to follow laser-cutting dynamically to achieve flexible designs and facilitating processing. The system comprises: a processing station; two sets of magnetic belts arranged respectively on a feeding side and a discharging side of the processing station, with each magnetic belt of the sets being able to be stretched and retracted and the distance between magnetic belts being adjustable; a laser-cutting unit provided at the processing station; a feeding robot and a tooling arranged on an outer side of the set of magnetic belts on the feeding side, with a pile of blocks being arranged on the rear side of the tooling and a block edge measuring device being installed at the tooling; a discharging robot and a tooling arranged on an outer side of the set of magnetic belts on the (Continued)

discharging side, with a pile of sheets being arranged on the rear side of the tooling; a scrap conveyor device arranged on the rear side of the processing station perpendicular to the feeding direction; a dust treating device and a real-time measurement device for the cutting of the blocks provided at the processing station; a position detecting device for the sheets in front of the pile of sheets and a transfer location arranged at the position of the set of magnetic belts on the discharging side outside the processing station; and a cutting control system.

9 Claims, 4 Drawing Sheets

(51) Int. Cl.
| | |
|---|---|
| *B23K 26/16* | (2006.01) |
| *B23K 37/04* | (2006.01) |
| *B23K 37/00* | (2006.01) |
| *B23K 37/02* | (2006.01) |
| *B23K 26/03* | (2006.01) |
| *B23K 101/18* | (2006.01) |

(52) U.S. Cl.
CPC .......... *B23K 26/0876* (2013.01); *B23K 26/16* (2013.01); *B23K 37/00* (2013.01); *B23K 37/0235* (2013.01); *B23K 37/0408* (2013.01); *B23K 2101/18* (2018.08)

(58) Field of Classification Search
USPC .................................................. 219/121.72
See application file for complete search history.

(56) References Cited

U.S. PATENT DOCUMENTS

| | | | |
|---|---|---|---|
| 2016/0039050 A1* | 2/2016 | Yang | B23K 26/38 219/121.72 |
| 2016/0151858 A1* | 6/2016 | Oh | B23K 37/00 219/121.82 |
| 2016/0273641 A1* | 9/2016 | Mitsui | F16H 55/26 |
| 2016/0288257 A1* | 10/2016 | Deiss | B23K 26/0876 |
| 2016/0297036 A1* | 10/2016 | Schmauder | B23K 37/0235 |
| 2016/0311069 A1* | 10/2016 | Deiss | B23K 26/0876 |

FOREIGN PATENT DOCUMENTS

| | | |
|---|---|---|
| CN | 203696572 U | 7/2014 |
| CN | 104400232 A | 3/2015 |
| CN | 104555519 A | 4/2015 |
| CN | 105033468 A | 11/2015 |
| EP | 2823932 A1 | 1/2015 |
| JP | 6-63780 A | 8/1994 |

* cited by examiner

METHOD AND SYSTEM FOR DYNAMICALLY FOLLOWING LASER CUTTING WITH MAGNETIC BELT

CROSS-REFERENCE TO RELATED APPLICATIONS

This application is a 371 U.S. National Phase of PCT International Application No. PCT/CN2016/077622, filed on Mar. 29, 2016, which claims benefit and priority to Chinese patent application No. 201510546849.3, filed on Aug. 31, 2015. Both of the above-referenced applications are incorporated by reference herein in their entirety.

TECHNICAL FIELD

The present invention relates to the field of metal processing and in particular to a method and a system for enabling magnetic belts to dynamically follow laser-cutting in the field of automobile manufacturing technologies.

BACKGROUND

Material-cutting processing based on laser technologies has become a mature commercially available technique, and numeral control laser processing systems are widely applied for rectangular metallic plates. With the flourishing development of laser technologies, the methods for plate processing can be applied with a higher speed and versatility. However, higher demands are proposed on automatic feeding and discharging as well as high-tempo continuous production. Decoiling laser-cutting processing for coil materials is under research and gradual application, for example, a conveyor system for laser-cutting processing of a coiled material is disclosed in Chinese patent CN 102281986A. In that system, two series of conveyors and a plurality of parallel supporting conveyors included are used to support strip-like profiles, and at the same time a laser head moving back and forth along a longitudinal axis of a crossbeam member processes the coil so as to obtain sheets. The supporting conveyors can avoid the cutting path, allowing the laser head to cut through the raw materials for acquiring a cut profile. This significantly remedy and solve the problems of the inability to cut the coils, the avoidance of the cutting path for a needle-like cutting table, and the resultant fallen scraps, and has become a novel method for sheet processing in place of mould blanking for coils. The method avoids the requirement of the stamping tonnage for a high-strength material and reduces the high mould design and maintenance costs. In addition, the method based on laser-cutting of coils also contributes greatly to the increase in the material utilisation rate.

In order to process the material in coils, the function of decoiling and straightening needs to be provided in an early stage of the production process, which requires a decoiling machine, a feeding clamp, a remnant cutter, a movable sleeve, and a feeding machine, causing a bulky production line, high investment and relatively low flexibility due to an additional preparation time for decoiling during the processing. Moreover, the tempo of laser-cutting itself usually cannot catch up with the high speed of decoiling and feeding, so that the waiting time in the production line is long.

It would be a convenient and cost-efficient method to feed the materials in blocks and process same with laser. However, a commonly used numeral laser cutter employs a needle-like table, leading to the problem of low cutting quality and inability to automatically separate out scraps of irregular shapes due to the interferences between the laser-cutting path and the needle-like table. Therefore, the processing method has the problem of a low automation efficiency, and its processing manner of combined manual and semi-automatic operations cannot fulfil the requirement of massive processing for millions of pieces. In order to solve the above-mentioned problems, a pad template with modules provided on a crossbeam is disclosed in Chinese patent application No. 201310157659.3, which also discloses new methods for supporting and carrying materials but has a low flexibility of online dynamic adjustment.

SUMMARY OF THE INVENTION

The objective of the present invention is to provide a method and a system for enabling magnetic belts to follow laser-cutting dynamically, which can achieve the processing of blocks into one or more pieces of sheets without bringing the laser-cutting path into contact with the magnetic belts, stack the sheets in piles and sort out scraps on-line automatically.

In order to achieve the above-mentioned object, the technical solution of the present invention is:

The system for enabling magnetic belts to follow laser-cutting dynamically comprises: a processing station; two sets of magnetic belts arranged respectively on a feeding side and a discharging side of the processing station, with each magnetic belt of the sets being able to be stretched and retracted and the distance between magnetic belts being adjustable; a laser-cutting unit provided at the processing station and comprising at least one laser cutter and a laser cutting head; a feeding robot and a tooling of the feeding robot, which are arranged on an outer side of the set of magnetic belts on the feeding side of the processing station, with a pile of blocks being arranged on the opposite side and a block edge measuring device being installed at the tooling; a discharging robot and a tooling of the discharging robot, which are arranged on an outer side of the set of magnetic belts on the discharging side of the processing station, with a pile of sheets being arranged on the opposite side; a scrap conveyor device arranged on the side of the processing station perpendicular to the feeding direction; a dust treating device and a real-time measurement device for the cutting of the blocks, which are provided at the processing station; a position detecting device in front of the pile of sheets and a transfer location arranged at the position of the set of magnetic belts on the discharging side outside the processing station; and a cutting control system, which is respectively connected to the sets of magnetic belts, the laser-cutting unit, the feeding robot, the discharging robot, the scrap conveyor device, the dust treating device, the real-time measurement device and the position detecting device for the sheets, so that the units and devices communicate with each other to establish an associative operation control and the stretching and retraction of the magnetic belts follow the laser cutting head.

Further, the two sets of magnetic belts comprise: conveyor motors for respectively controlling the sets of magnetic belts on the feeding side and the discharging side, and a control module for the conveyor motors; a plurality of magnetic belts, each comprising: at least one independently controllable electromagnetic module; stretching and retraction motors for respectively controlling the stretching and retraction of the magnetic belts, and a control module for the stretching and retraction motors; and width motors for controlling the distance between the magnetic belts, and a control module for the width motors.

Further, the block edge measuring device comprises a range finder for detecting the position of the pile of blocks and two photoelectric switches.

Still further, the real-time measurement device for the cutting of the blocks comprises: two cameras for measuring the coordinates of a workpiece; and two cameras for visual detection and identification of separation after cutting and visual detection and identification of falling scraps.

Further, the position detecting device for the sheets in front of the pile of sheets comprises a camera installed above the transfer location for detecting the position of the sheets in the transfer location.

The laser-cutting method for the system for enabling magnetic belts to follow laser-cutting dynamically in the present invention is characterized in that, a) first blocks of a determined length and width are obtained according to the graphic design of sheets;

b) the distance of the magnetic belts on the feeding side is pre-adjusted to a fixed distance and a fixed stretching/retraction position according to the width of the blocks and the cutting profile so as to form a feeding start position for the set of magnetic belts on the feeding side, and at the same time the magnetic belts on the discharging side is pre-adjusted to a fixed distance and a fixed stretching/retraction position according to the width of the blocks and the cutting profile so as to form a discharging start position for the set of magnetic belts on the discharging side;

c) after obtaining the blocks of the determined length and width, the blocks are placed on the piles of blocks, the block edge measuring device measures the position of the blocks in the piles, then the tooling of the feeding robot picks up a piece of block and places same on the set of magnetic belts on the feeding side, and the set of magnetic belts on the feeding side takes the block to the processing station for laser cutting;

d) the position of the block entering the laser-cutting area of the processing station is measured rapidly by the real-time measurement device, so as to correct the coordinates of the origin and the angle of a workpiece coordinate system in the control system before the cutting operation, and when the measurement is complete, the laser-cutting head cuts the block in a planned path according to a profile to be processed;

during the cutting, the magnetic belts on the feeding side and the discharging side are adjusted synchronously dynamically according to the cutting path and the stretching/retraction adjustment amount is determined by the profile to be cut, wherein the synchronous dynamic adjustment is effected by sending a signal by the cutting control system to the control module for the stretching and retraction of the magnetic belt, and during the adjustment, the magnetic belts need to avoid a slit cut during the cutting procedure, in order to prevent the laser from penetrating the blocks and making contact with any of the magnetic belts; the magnetic belts on the feeding side and the discharging side at the position corresponding to a cut profile can be stretched or retracted for stabilising and supporting the sheets being processed while fulfilling the needs of material discharging and receiving on the discharging side;

during the cutting procedure, as regards the scraps formed, a signal is generated in the cutting control system and transmitted to the real-time measurement device for detecting and identifying the falling of the scraps in real time; when the cutting procedure is complete, the cutting control system sends a signal for carrying out a detection of all the cut profile by the real-time measurement device for the cutting of the blocks, so as to determine the separation of the processed sheets and the blocks;

e) when the sheets are processed, the set of magnetic belts on the feeding side is at a feeding end location and the set of magnetic belts on the discharging side is at a discharging end location; the processed sheets enter an outputting state at the discharging end location on the set of magnetic belts on the discharging side and is output to the transfer location, and at the same time, the sets of magnetic belts on the feeding side and the discharging side are stretched or retracted back to the start positions again, and a second piece of block is sent by means of the set of magnetic belts on the feeding side to the processing station for laser cutting so as to perform the cyclic processing of feeding, cutting and discharging; and f) before transferring the sheets, the camera of the position detecting device for the sheets detects the position of the sheets, feeds the position of the sheets back to the discharging robot for correcting its posture, and then the tooling at the end of the discharging robot attracts and picks up the processed sheets and stacks same at the location of the pile.

Further, during the cutting procedure, the magnetic belts on the feeding side and the discharging side can be adjusted synchronously and dynamically according to the cutting path: for the cutting path formed by the cutting profile, generated cutting feature information corresponds to a respective signal for the stretching/retraction operation of the magnetic belt to be adjusted, so as to achieve the adjustment of stretching/retraction of the magnetic belt under the control of the cutting system; each magnetic belt in the sets of magnetic belts can be dynamically adjusted to stretch and retract, and during the adjustment of the magnetic belt, the cutting head carries out the cutting in the cutting path synchronously.

Preferably, in step d), the position and angle of the blocks is measured by means of the tooling before feeding, the distance for a defined height between the tooling and the blocks is measured by means of the range finder in the block edge measuring device, and the photoelectric switches detect the position of the edge of the blocks in the X and Y directions and generate an output signal for determining the position and angle of the blocks.

Preferably, the magnetism of the sets of magnetic belts on the feeding side and the discharging side is activated or deactivated by controlling the electromagnetic module, wherein the electromagnetic module in the laser-cutting area is fully or partially magnetised when the sets of magnetic belts are stationary, and the electromagnetic module is fully demagnetised during the stretching or retraction of the sets of the magnetic belts; for the cutting path formed by the cutting profile, a magnetic signal for the electromagnetic module for the magnetic belts, which corresponds to magnetic feature information, is generated so as to achieve the control of the magnetism of the electromagnetic module under the control of the cutting control system.

The blocks of the determined length and width obtained according to the graphic design of sheets are placed on the piles of blocks, the block edge measuring device at the tooling of the feeding robot measures the position of the blocks in the piles, then the tooling of the feeding robot picks up a piece of block and places same on the set of magnetic belts on the feeding side, and the set of magnetic belts on the feeding side takes the block to the processing station for laser cutting. The distance of the magnetic belts on the feeding side is pre-adjusted to a fixed distance and a fixed stretching/retraction position according to the width of the blocks and the cutting profile so as to form a feeding start position for the set of magnetic belts on the feeding side, and at the same time the magnetic belts on the discharging side is pre-adjusted to a fixed distance and a fixed stretching/retraction position according to the width of the blocks and the cutting profile so as to form a discharging start position for the set of magnetic belts on the discharging side. The position of the block entering the laser-cutting area of the processing station is measured rapidly by the workpiece coordinate measurement system, so as to correct the coordinates of the origin and the angle of a workpiece coordinate system in the control system before the cutting operation, and when the measurement is complete, the laser-cutting unit cuts the block in a planned path according to a profile to be processed. During the cutting, the magnetic belts on the feeding side and the discharging side are adjusted synchronously dynamically according to the cutting path, wherein the adjustment is determined according to the cutting profile and during the adjustment, the magnetic belts need to avoid a slit cut during the cutting procedure, in order to prevent the laser from penetrating the blocks and making contact with any of the magnetic belts; the magnetic belts on the feeding side and the discharging side at the position corresponding to a cut profile can be stretched or retracted for stabilising and supporting the sheets being processed while fulfilling the needs of material discharging and receiving on the discharging side. During the cutting procedure, as regards the scraps formed, a signal is generated in the cutting control system and transmitted to the system for visual detection and identification of falling scraps, so as to achieve detection of the falling scraps in real time. When the cutting procedure is complete, the cutting control system sends a corresponding signal for carrying out a detection of all the cut profile by the visual system for cutting and separation, so as to determine the separation of the processed sheets and the blocks. When the sheets are processed, the set of magnetic belts on the feeding side is at a feeding end location and the set of magnetic belts on the discharging side is at a discharging end location. The processed sheets enter an outputting state at the discharging end location on the set of magnetic belts on the discharging side and is output to the transfer location, before transferring the sheets, the position detecting device for the sheets detects the position of the sheets, feeds the position of the sheets back to the transferring and discharging robot for correcting its posture, and then the tooling at the end of the transferring and discharging robot attracts and picks up the processed sheets and stacks same at the location of the pile.

During the cutting procedure, the magnetic belts on the feeding side and the discharging side can be adjusted synchronously and dynamically according to the cutting path in the following specific manner: For the cutting path formed by the cutting profile, cutting feature information is extracted therefrom so as to output a respective signal by the cutting control system, i.e. the generated cutting feature information corresponds to the stretching/retraction operation of the magnetic belt to be adjusted, and the adjustment of the magnetic belt is effected by the numeral control and a control for a shaft of the magnetic belt; each magnetic belt in the sets of magnetic belts can be dynamically adjusted to stretch and retract, and during the adjustment of the magnetic belt, the numeral control unit carries out the cutting in the cutting path synchronously.

Further, the specific procedure of the synchronous dynamic adjustment is as follows: the blocks are held stationary after being moved to the cutting area, and at this moment, the set of magnetic belts on the feeding side is at the feeding start location and the set of magnetic belts on the discharging side is at the discharging start location. According to the actions of the magnetic belts for the adjustment corresponding to the generated feature information in operation, when the cutting procedure proceeds to the feature information in the cutting control system, the corresponding magnetic belt begins to stretch or retract to a designed position, which is considered to be the dynamic adjustment stage for the sets of magnetic belts on the feeding side and discharging side. The magnetic belts are adjusted dynamically to positions in which they do not interfere with laser beams according the laser-cutting profile, while the cutting action proceeds normally until the cutting is finished. The sets of magnetic belts on the feeding side and the discharging side are then adjusted to the end locations. The processed sheet obtained is output by the set of magnetic belts on the discharging side, and at the same time the sets of magnetic belts on the feeding side and on the discharging side are stretched or retraction again back to the start locations. Thereafter the next block will enter the laser processing area and the cyclic processing consisting of feeding, cutting and discharging continues.

The advantages of the present invention lie in:

The method and system for enabling magnetic belts to follow laser-cutting dynamically in the present invention employ a flexible block feeding manner, so that the production line is greatly improved, and the material utilisation rate is further increased by cutting the blocks with laser and optimising the discharging.

In addition, the functions such as sheet supporting, material carrying, automatic sorting out of scraps, passing through of laser are realised using the method for enabling magnetic belts to follow laser-cutting dynamically in the present invention, and the feeding and discharging operations are carried out by robots, thereby achieving the purpose of automatic processing.

DETAILED DESCRIPTION OF THE EMBODIMENTS

Figure 1:
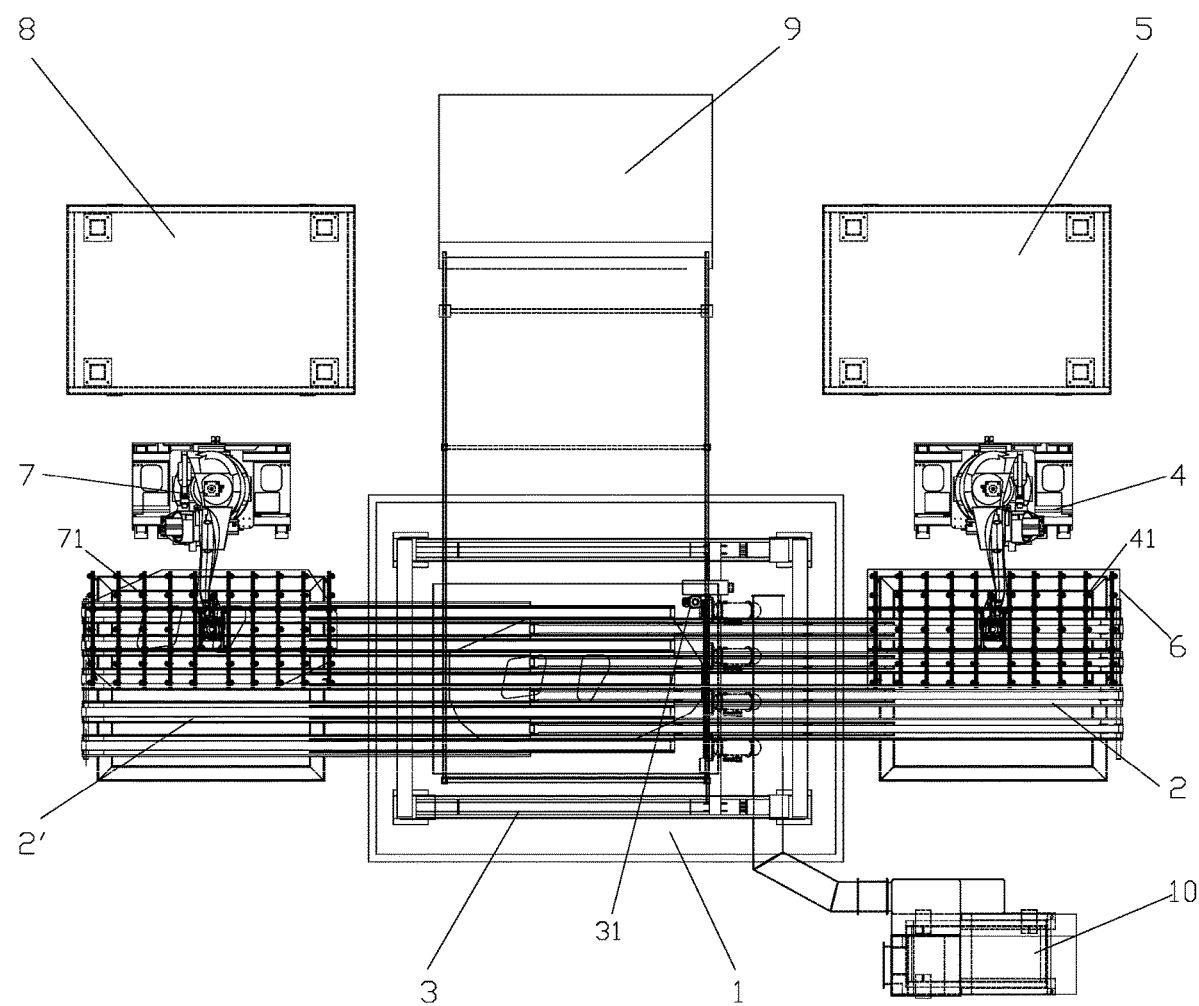
FIG. 1 is the arrangement of one embodiment of the present invention.
Figure 2:
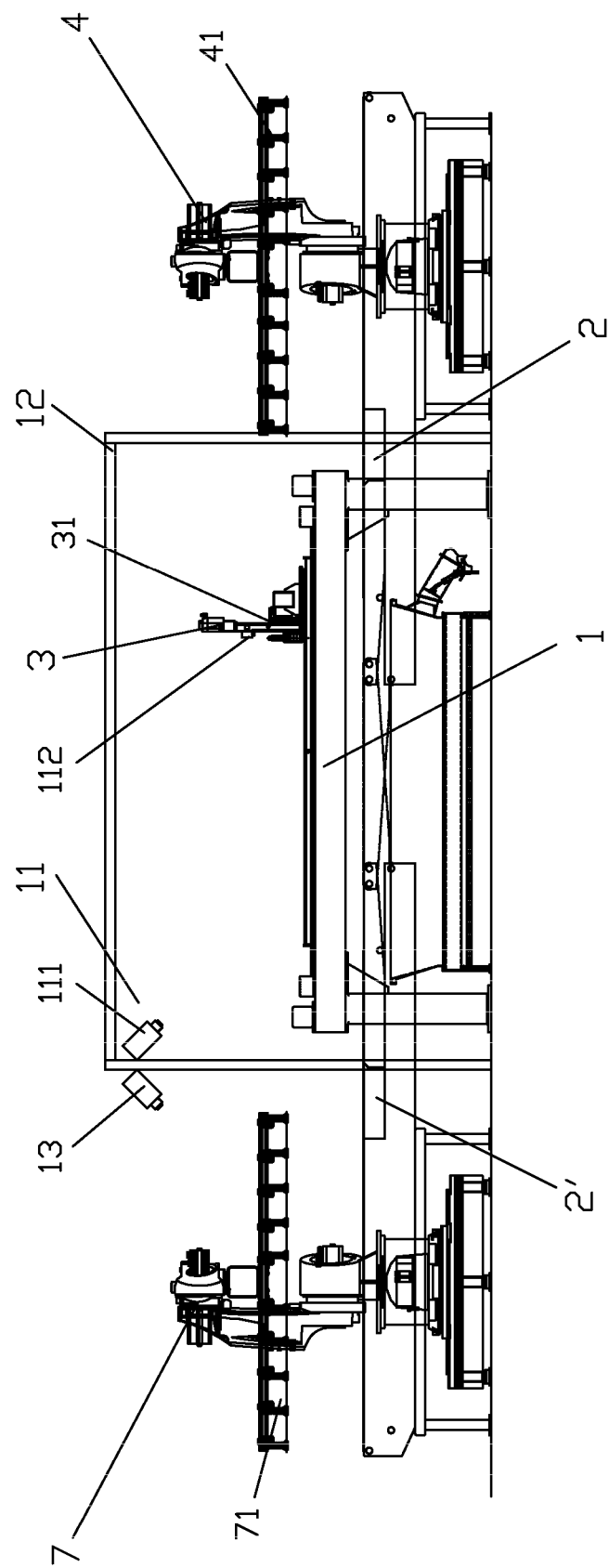
FIG. 2 is a schematic view of the assembly position of cameras in the embodiment of the present invention.

Referring to FIGS. 1-7, a system for enabling magnetic belts to follow laser-cutting dynamically in the present invention comprises:

a processing station 1;

two sets of magnetic belts 2, 2' arranged respectively on a feeding side and a discharging side of the processing station 1, with each magnetic belt of the sets 2, 2' being able to be stretched and retracted and the distance between magnetic belts being adjustable;

a laser cutter 3 and a laser-cutting head 31 provided at the processing station 1;

a feeding robot 4 and a tooling 41 of the feeding robot, which are arranged on an outer side of the set of magnetic belts 2 on the feeding side of the processing station 1, with a pile of blocks 5 being arranged on the opposite side and a block edge measuring device 6 being installed at the tooling 41;

a discharging robot 7 and a tooling 71 of the discharging robot, which are arranged on an outer side of the set of magnetic belts 2' on the discharging side of the processing station 1, with a pile of sheets 8 being arranged on the opposite side;

a scrap conveyor device 9 arranged on the side of the processing station 1 perpendicular to the feeding direction;

a dust treating system 10 below the processing station 1;

and a real-time measurement device 11 for the cutting of the blocks, comprising two cameras 111 for measuring the coordinates of a workpiece which are installed on the laser cutter 3, wherein one of the cameras is mounted on an X-Y platform of the cutter and the other is mounted on the Z-axis of the cutter for enhanced detection accuracy. Two cameras 112 for visual detection and identification of separation after cutting and visual detection and identification of falling scraps are installed on an enclosure 12 of the isolated processing station 1.

A position detecting device 13 before the transfer of the sheets is arranged at a transfer location at the position of the set of magnetic belts on the discharging side on the outer side of the processing station 1, i.e. on the outer side of the enclosure 12 outside the processing station 1. The visual range of a camera of the position detecting device 13 is installed at an inclined angle so as to be able to cover the sheet transfer area.

The laser cutter 3 takes the form of a robot in right-angle coordinates which can move in X, Y and Z directions, having a working travel of 4000 mm long (X axis)×2000 mm wide (Y axis)×200 mm thick (Z axis).

The blocks of the determined length and width obtained according to the design after trepanning are placed on the piles of blocks 1, the block edge measuring device 6 at the feeding tooling 41 measures in one pass the position of the blocks in the piles of blocks 1 so as to correct the posture of the feeding robot 4, and then the tooling 41 of the feeding robot 4 picks up a piece of block and places same on the set of magnetic belts 2 on the feeding side. The distance of the magnetic belts on the feeding side can be pre-adjusted to a fixed distance and a fixed stretching/retraction position according to the width of the blocks and the cutting profile so as to form a feeding start position for the set of magnetic belts on the feeding side, and at the same time the magnetic belts on the discharging side is pre-adjusted to a fixed distance and a fixed stretching/retraction position according to the width of the blocks and the cutting profile so as to form a discharging start position for the set of magnetic belts on the discharging side.

In embodiment 1, the set of magnetic belts 2 on the feeding side has 4 magnetic belts and the set of magnetic belts 2' on the discharging side has 5 magnetic belts. The set of magnetic belts 2 on the feeding side brings the block to the laser-cutting area, and the position of the block entering the laser-cutting area is measured rapidly by the two cameras 111 for measuring the coordinates of the workpiece, at a precision of below 1 mm By effectively measuring and knowing the position and angle of the block, the position of origin and angle of the workpiece coordinate system in the numeral control system can be corrected before cutting. The laser cutting head 31 proceeds over the block in a planned path according to the profile to be processed based on the corrected coordinates and angle. The laser cutter 3 enables the laser cutting head 31 to move in X, Y and Z directions so as to finish the cutting actions.

During the cutting, the magnetic belts on the feeding side and the discharging side are adjusted synchronously dynamically according to the cutting path and the stretching/retraction adjustment amount is determined by the profile to be cut, wherein the synchronous dynamic adjustment is effected by sending a signal by the cutting control system to the control module for the stretching and retraction of the magnetic belt, and during the adjustment, the magnetic belts need to avoid a slit cut during the cutting procedure, in order to prevent the laser from penetrating the blocks and making contact with any of the magnetic belts; the magnetic belts on the feeding side and the discharging side at the position corresponding to a cut profile can be stretched or retracted for stabilising and supporting the sheets being processed while fulfilling the needs of material discharging and receiving on the discharging side. When the sheets are processed, the set of magnetic belts on the feeding side is at a feeding end location and the set of magnetic belts on the discharging side is at a discharging end location, and the separation of scraps and supply failures can be detected by the two cameras 112 for visual detection and identification of separation after cutting and visual detection and identification of falling scraps. After detection, the sheets enter an outputting state at the discharging end location on the set of magnetic belts on the discharging side and is output to the transfer location. The accurate position for picking up the sheet can be detected by the position detecting device 13 before transfer and fed back, so that the discharging robot 7 corrects its transfer posture and it is thereby ensured that the position deviation of the pile of sheets is within a precision requirement. After the posture of the discharging tooling 71 at an end of the discharging robot has been corrected, the tooling picks up the sheet obtained and stacks same onto the pile 8 of sheets.

During the cutting procedure, the magnetic belts on the feeding side and the discharging side can be adjusted synchronously and dynamically according to the cutting path in the following specific manner: For the cutting path formed by the cutting profile, cutting feature information is extracted therefrom so as to output a respective signal by the cutting control system, i.e. the generated cutting feature information corresponds to the stretching/retraction operation of the magnetic belt to be adjusted, and the adjustment of the magnetic belt is effected by the numeral control and a control for a shaft of the magnetic belt; each magnetic belt in the sets of magnetic belts can be dynamically adjusted to stretch and retract, and during the adjustment of the magnetic belt, the numeral control unit carries out the cutting in the cutting path synchronously. Further, the specific procedure of the synchronous dynamic adjustment is as follows: the blocks are held stationary after being moved to the cutting area, and at this moment, the set of magnetic belts on the feeding side is at the feeding start location and the set of magnetic belts on the discharging side is at the discharging start location. According to the actions of the magnetic belts for the adjustment corresponding to the generated feature information in operation, when the cutting procedure proceeds to the feature information in the cutting control system, the corresponding magnetic belt begins to stretch or retract to a designed position, which is considered to be the dynamic adjustment stage for the sets of magnetic belts on the feeding side and discharging side. The magnetic belts are adjusted dynamically to positions in which they do not interfere with laser beams according the laser-cutting profile, while the cutting action proceeds normally until the cutting is finished. The sets of magnetic belts on the feeding side and the discharging side are then adjusted to the end locations. The processed sheet obtained is output by the set of magnetic belts on the discharging side, and at the same time the sets of magnetic belts on the feeding side and on the discharging side are stretched or retraction again back to the start locations. Thereafter the next block will enter the laser processing area and the cyclic processing consisting of feeding, cutting and discharging continues.

Figure 3:
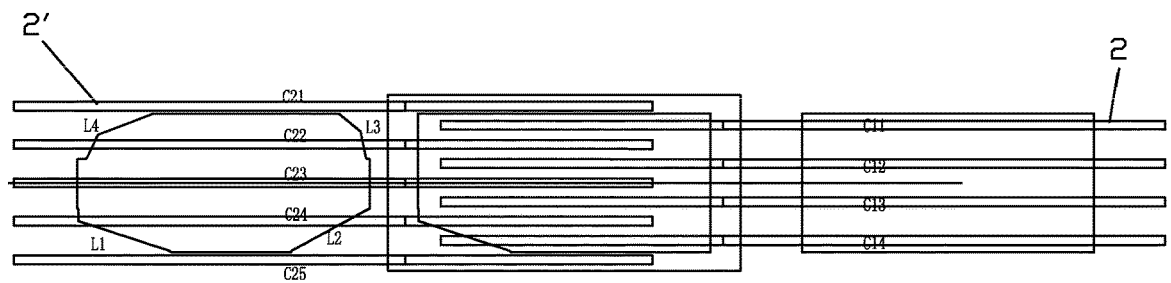
FIGS. 3 to 6 show the procedure of adjustment of the magnetic belts in the present invention, for enabling the magnetic belts to follow the laser-cutting dynamically.
Figure 4:
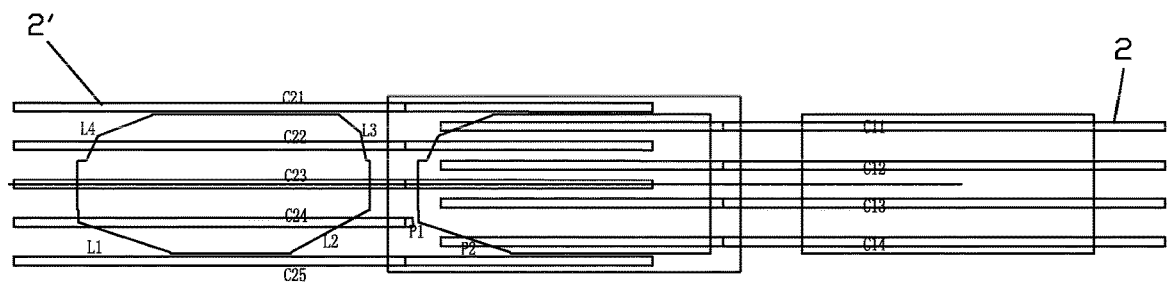

In particular, during the cutting procedure, the 4 magnetic belts C11, C12, C13, C14 of the set of magnetic belts 2 on the feeding side and the 5 magnetic belts C21, C22, C23, C24, C25 of the set of magnetic belts 2' on the discharging side are first located at the feeding start position and discharging start position respectively, as shown in FIG. 3. In this figure, cutting paths L1, L2, L3, L4 are shown, wherein the cutting path L1 is divided into two parts P1 and P2 containing cutting feature signals N1 and N2 respectively. The cutting path such as P1 and P2 are only defined to illustrate the stretching and retraction of the magnetic belts, and one cutting line may consist of a plurality of paths. When cutting the path P1, the discharging magnetic belt C24 has been retracted according to the feature signal N1 to avoid the cutting path P1, as shown in FIG. 4.

Figure 5:
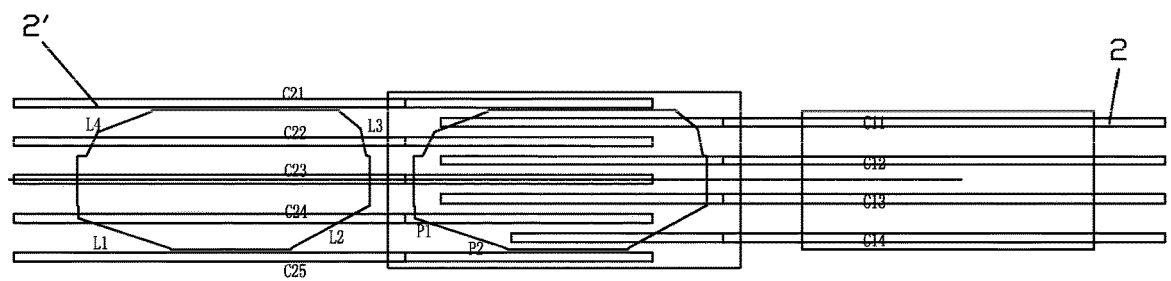
Figure 6:
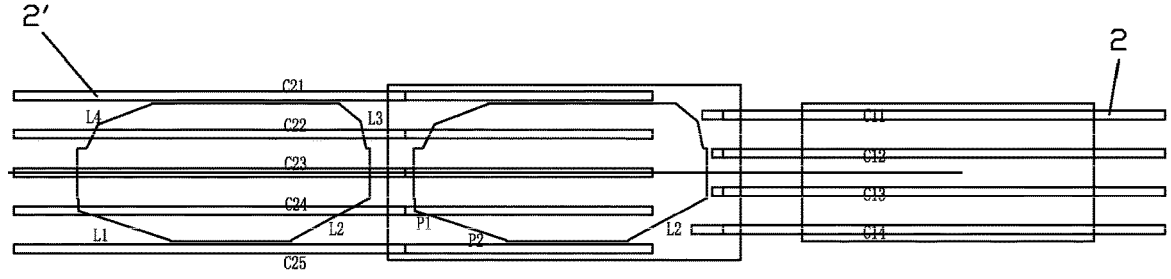

When cutting along the cutting path P1, the feeding magnetic belt C14 has been retracted according to the feature signal N2 to avoid the cutting path P2, while the discharging magnetic belt C24 has been stretched according to the feature signal N2 to carry the part of the sheet, as shown in FIG. 5. Thereafter, the laser head cuts through the path L2. At that time, the feeding magnetic belt C14 is again retracted according to a feature signal N3 to avoid the cutting path L2, and the feeding magnetic belt C14 has been adjusted to the feeding end position. FIG. 6 also shows the final end positions of the feeding magnetic belt and the discharging magnetic belt. The next block enters the pre-set cutting area and the next cyclic operation for block processing commences. In this embodiment, the magnetic belts which are moving are demagnetised, while all or some of the magnetic belts which are stationary can be magnetised according to processing requirements. Each magnetic belt is provided with an electromagnetic module and can be controlled individually. Likewise, for the cutting path formed by the cutting profile, a magnetic signal for the electromagnetic module for the magnetic belts, which corresponds to magnetic feature information, is generated so as to achieve the control of the magnetism under the control of the cutting system.

Figure 7:
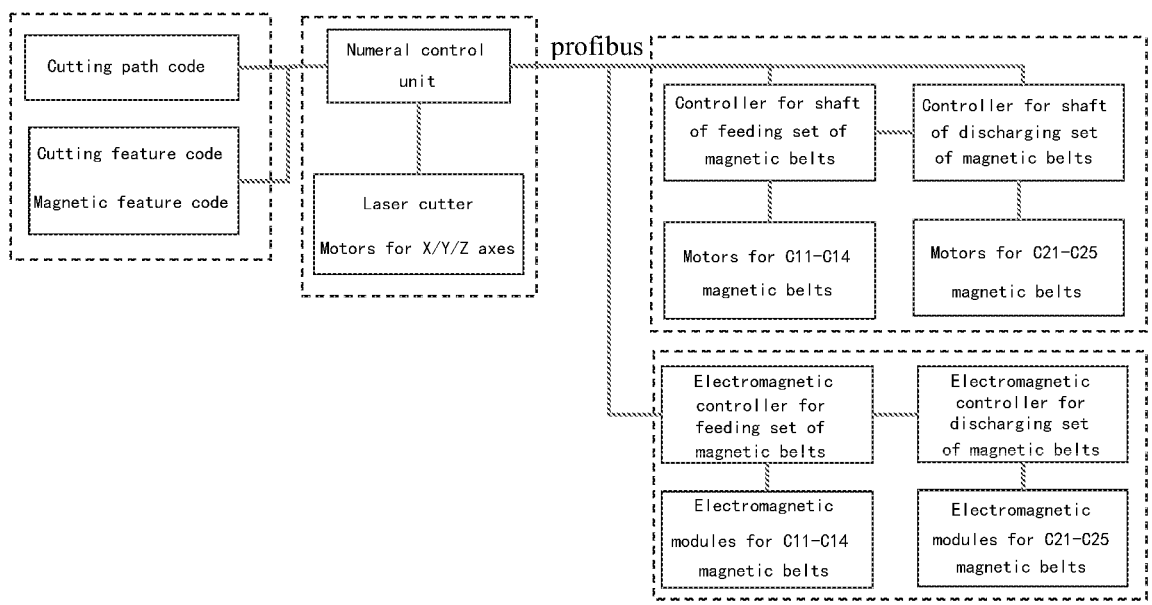
FIG. 7 is a schematic view of a synchronising method for a numeral control system and a control system for a shaft of the magnetic belts in the present invention.

In order to realise the method for enabling the magnetic belts to follow the laser-cutting, the cutting control system for implementing the method achieve a cooperative control of the laser cutter and the feeding and discharging sets of magnetic belts by means of Profibus communication between the numeral control system, the magnetic belt control system and the electromagnetic control system for the magnetic belts. This method effectively ensures that the sets of magnetic belts follow the laser-cutting procedure dynamically and effectively controls the magnetisation and demagnetisation, so that the numeral control system can make the rule about the cutting path, the cutting feature signals and the magnetic feature signals beforehand A synchronisation method for the numeral control system and the magnetic belt control system is shown in FIG. 7.

The invention claimed is:

1. A system for enabling magnetic belts to follow laser-cutting dynamically, characterized in that, the system comprises:

a processing station;
two sets of magnetic belts arranged respectively on a feeding side and a discharging side of the processing station, with each magnetic belt of the sets being able to be stretched and retracted and the distance between magnetic belts being adjustable;
a laser-cutting unit provided at the processing station and comprising at least one laser cutter and a laser cutting head;
a feeding robot and a tooling of the feeding robot, which are arranged on an outer side of the set of magnetic belts on the feeding side of the processing station, with a pile of blocks being arranged on the opposite side and a block edge measuring device being installed at the tooling;
a discharging robot and a tooling of the discharging robot, which are arranged on an outer side of the set of magnetic belts on the discharging side of the processing station, with a pile of sheets being arranged on the opposite side;
a scrap conveyor device arranged on the side of the processing station perpendicular to the feeding direction;
a dust treating device and a real-time measurement device for the cutting of the blocks, which are provided at the processing station;
a position detecting device in front of the pile of sheets and a transfer location arranged at the position of the set of magnetic belts on the discharging side outside the processing station; and
a cutting control system, which is respectively connected to the sets of magnetic belts, the laser-cutting unit, the feeding robot, the discharging robot, the scrap conveyor device, the dust treating device, the real-time measurement device and the position detecting device for the sheets, so that the units and devices communicate with each other to establish an associative operation control and the stretching and retraction of the magnetic belts follow the laser cutting head.

2. The system for enabling magnetic belts to follow laser-cutting dynamically according to claim 1, characterized in that, the set of magnetic belts comprises:
conveyor motors for respectively controlling the sets of magnetic belts on the feeding side and the discharging side, and a control module for the conveyor motors;
a plurality of magnetic belts, each comprising:
at least one independently controllable electromagnetic module;
stretching and retraction motors for respectively controlling the stretching and retraction of the magnetic belts, and a control module for the stretching and retraction motors; and
width motors for controlling the distance between the magnetic belts, and a control module for the width motors.

3. The system for enabling magnetic belts to follow laser-cutting dynamically according to claim 1, characterized in that, the block edge measuring device comprises a range finder for detecting the position of the pile of blocks and two photoelectric switches.

4. The system for enabling magnetic belts to follow laser-cutting dynamically according to claim 1, characterized in that, the real-time measurement device for the cutting of the blocks comprises:
two cameras for measuring the coordinates of a workpiece; and two cameras for visual detection and identification of falling scraps and for visual detection and identification of separation after cutting.

5. The system for enabling magnetic belts to follow laser-cutting dynamically according to claim 1, characterized in that, the position detecting device for the sheets in front of the pile of sheets comprises a camera installed above the transfer location for detecting the position of the sheets in the transfer location.

6. A laser-cutting method for the system for enabling magnetic belts to follow laser-cutting dynamically according to claim 1, characterized in that,
   a) first blocks of a determined length and width are obtained according to the graphic design of sheets;
   b) the distance of the magnetic belts on the feeding side is pre-adjusted to a fixed distance and a fixed stretching/retraction position according to the width of the blocks and the cutting profile so as to form a feeding start position for the set of magnetic belts on the feeding side, and at the same time the magnetic belts on the discharging side is pre-adjusted to a fixed distance and a fixed stretching/retraction position according to the width of the blocks and the cutting profile so as to form a discharging start position for the set of magnetic belts on the discharging side;
   c) after obtaining the blocks of the determined length and width, the blocks are placed on the piles of blocks, the block edge measuring device measures the position of the blocks in the piles, then the tooling of the feeding robot picks up a piece of block and places same on the set of magnetic belts on the feeding side, and the set of magnetic belts on the feeding side takes the block to the processing station for laser cutting;
   d) the position of the block entering the laser-cutting area of the processing station is measured rapidly by the real-time measurement device, so as to correct the coordinates of the origin and the angle of a workpiece coordinate system in the control system before the cutting operation, and when the measurement is complete, the laser-cutting head cuts the block in a planned path according to a profile to be processed;
   during the cutting, the magnetic belts on the feeding side and the discharging side are adjusted synchronously dynamically according to the cutting path and the stretching/retraction adjustment amount is determined by the profile to be cut, wherein the synchronous dynamic adjustment is effected by sending a signal by the cutting control system to the control module for the stretching and retraction of the magnetic belt, and during the adjustment, the magnetic belts need to avoid a slit cut during the cutting procedure, in order to prevent the laser from penetrating the blocks and making contact with any of the magnetic belts; the magnetic belts on the feeding side and the discharging side at the position corresponding to a cut profile can be stretched or retracted for stabilising and supporting the sheets being processed while fulfilling the needs of material discharging and receiving on the discharging side;
   during the cutting procedure, as regards the scraps formed, a signal is generated in the cutting control system and transmitted to the real-time measurement device for detecting and identifying the falling of the scraps in real time; when the cutting procedure is complete, the cutting control system sends a signal for carrying out a detection of all the cut profile by the real-time measurement device for the cutting of the blocks, so as to determine the separation of the processed sheets and the blocks;
   e) when the sheets are processed, the set of magnetic belts on the feeding side is at a feeding end location and the set of magnetic belts on the discharging side is at a discharging end location; the processed sheets enter an outputting state at the discharging end location on the set of magnetic belts on the discharging side and is output to the transfer location, and at the same time, the sets of magnetic belts on the feeding side and the discharging side are stretched or retracted back to the start positions again, and a second piece of block is sent by means of the set of magnetic belts on the feeding side to the processing station for laser cutting so as to perform the cyclic processing of feeding, cutting and discharging; and
   f) before transferring the sheets, the camera of the position detecting device for the sheets detects the position of the sheets, feeds the position of the sheets back to the discharging robot for correcting its posture, and then the tooling at the end of the discharging robot attracts and picks up the processed sheets and stacks same at the location of the pile.

7. The laser-cutting method according to claim 6, characterized in that, during the cutting procedure, the magnetic belts on the feeding side and the discharging side can be adjusted synchronously and dynamically according to the cutting path: for the cutting path formed by the cutting profile, generated cutting feature information corresponds to a respective signal for the stretching/retraction operation of the magnetic belt to be adjusted, so as to achieve the adjustment of stretching/retraction of the magnetic belt under the control of the cutting system; each magnetic belt in the sets of magnetic belts can be dynamically adjusted to stretch and retract, and during the adjustment of the magnetic belt, the cutting head carries out the cutting in the cutting path synchronously.

8. The laser-cutting method according to claim 6, characterized in that, in step d), the position and angle of the blocks is measured by means of the tooling before feeding, the distance for a defined height between the tooling and the blocks is measured by means of the range finder in the block edge measuring device, and the photoelectric switches detect the position of the edge of the blocks in the X and Y directions and generate an output signal for determining the position and angle of the blocks.

9. The laser-cutting method according to claim 6, characterized in that, the magnetism of the sets of magnetic belts on the feeding side and the discharging side is activated or deactivated by controlling the electromagnetic module, wherein the electromagnetic module in the laser-cutting area is fully or partially magnetised when the sets of magnetic belts are stationary, and the electromagnetic module is fully demagnetised during the stretching or retraction of the sets of the magnetic belts; and for the cutting path formed by the cutting profile, a magnetic signal for the electromagnetic module for the magnetic belts, which corresponds to magnetic feature information, is generated so as to achieve the control of the magnetism of the electromagnetic module under the control of the cutting control system.

* * * * *